US006899293B2

(12) United States Patent
Dantes et al.

(10) Patent No.: US 6,899,293 B2
(45) Date of Patent: May 31, 2005

(54) FUEL INJECTION VALVE

(75) Inventors: Günter Dantes, Eberdingen (DE); Detlef Nowak, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 10/362,349

(22) PCT Filed: Jun. 18, 2002

(86) PCT No.: PCT/DE02/02209

§ 371 (c)(1),
(2), (4) Date: Aug. 4, 2003

(87) PCT Pub. No.: WO03/001052

PCT Pub. Date: Jan. 3, 2003

(65) Prior Publication Data

US 2004/0011899 A1 Jan. 22, 2004

(30) Foreign Application Priority Data

Jun. 22, 2001 (DE) ........................................ 101 30 208

(51) Int. Cl.$^{7}$ .......................... F02M 51/00; B05B 1/00; F03M 63/00; F16K 31/02; E03B 1/00

(52) U.S. Cl. ................................ 239/585.1; 239/585.5; 239/900; 239/602; 239/596; 239/533.2; 251/129.21; 137/625.33

(58) Field of Search ........................... 239/585.1, 585.3, 239/585.4, 585.5, 900, 602, 596, 533.2, 533.9, 533.12, 533.18; 251/129.21; 137/625.33

(56) References Cited

U.S. PATENT DOCUMENTS

| | | | | |
|---|---|---|---|---|
| 5,353,991 A | * | 10/1994 | De Nagel et al. ........ | 239/585.3 |
| 6,079,636 A | * | 6/2000 | Rembold et al. ........ | 239/533.4 |
| 6,736,104 B2 | * | 5/2004 | Maier et al. ........... | 239/533.12 |

FOREIGN PATENT DOCUMENTS

| | | |
|---|---|---|
| DE | 29 36 425 | 4/1981 |
| DE | 3735526 | 5/1988 |
| DE | 196 26 576 | 1/1998 |
| DE | 196 07 331 | 10/1999 |
| FR | 2 761 114 | 9/1998 |
| WO | 95 28561 | 10/1995 |

* cited by examiner

*Primary Examiner*—Dinh Q. Nguyen
*Assistant Examiner*—Seth Barney
(74) *Attorney, Agent, or Firm*—Kenyon & Kenyon

(57) ABSTRACT

A fuel injector with a magnetic coil, which cooperates with an armature acted upon by a restoring spring, the armature forming an axially movable valve part together with a valve needle. A valve-closure member, which forms a sealing seat with a valve-seat member, is provided at the valve needle. An inner pole and an outer pole form a magnetic circuit with the magnetic coil. A membrane is positioned at an inflow-side end face of the inner pole, which includes at least one orifice, which is covered by the inner pole in the dosed state of the fuel injector.

9 Claims, 1 Drawing Sheet

FUEL INJECTION VALVE

BACKGROUND INFORMATION

As an example, from German Patent No. DE 196 26 576 an electromagnetically actuable fuel injector is known, in which, for the electromagnetic actuation, an armature cooperates with an electrically energizable magnetic coil, and the lift of the armature are transmitted to a valve-closure member via a valve needle. The valve-closure member cooperates with a valve-seat surface to form a sealing seat. A plurality of fuel channels is provided in the armature. The armature is reset by a resetting spring.

Disadvantageous in the fuel injector known from German Patent No. DE 196 26 576 is, in particular, that the fuel quantity $q_{dyn}$ flowing through the fuel injector cannot be metered with sufficient precision when the valve-closure member lifts off from the sealing seat. The ratio of the maximally sprayed-off fuel quantity relative to the minimally sprayed-off fuel quantity, $q_{max}/q_{min}$, is relatively low. The characteristic curve of the fuel injector, which represents the profile of the dynamic flow rate $q_{dyn}$ as a function of the valve needle lift, is relatively flat, so that considerable fluctuations occur in the dynamic flow rate.

SUMMARY OF THE INVENTION

The fuel injector according to the present invention has the advantage over the related art that the fuel flow through the fuel injector may be blocked by a membrane positioned at an inflow-side end face of the inner pole until the membrane is lifted up by elastic deformation and an orifice in the membrane is released in the process. The thereby ensuing fuel flow follows an approximately stepped lift-throttle function.

It is advantageous, in particular, that, using a simple design, the membrane is in operative connection with the armature via a plunger. The individual parts may be produced in a simple and cost-effective manner.

The plunger and the membrane as well as the membrane and the inner pole are advantageously joined to each other by welding seams.

The plunger is inserted in a blind-end bore of the armature and thereby protected against slippage in an uncomplicated manner.

Furthermore, it is advantageous that the plunger reaches through the restoring spring acting upon the armature, as well as the sleeve applying initial stress to the restoring spring, thereby integrating the system in the fuel injector in a compact and space-saving manner.

Moreover, it is advantageous that the at least one orifice is dimensioned such that it does not act as a throttle and, thus, no lift throttling occurs.

DETAILED DESCRIPTION

Figure 1:
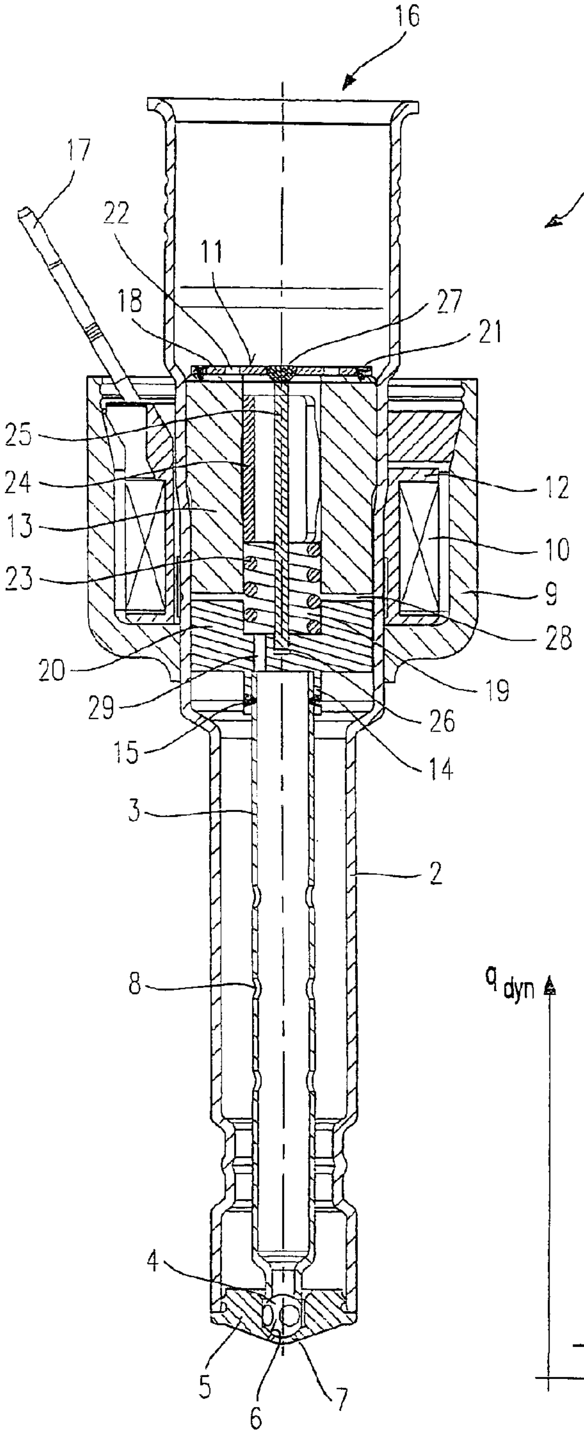
FIG. 1 shows a schematic section through an exemplary embodiment of a fuel injector designed according to the present invention.

In a part-sectional representation, FIG. 1 shows an exemplary embodiment of a fuel injector 1 according to the present invention. It is in the form of a fuel injector 1 for fuel-injection systems of mixture-compressing internal combustion engines having external ignition. Fuel injector 1 is suited for the direct injection of fuel into a combustion chamber (not shown) of an internal combustion engine.

Fuel injector 1 includes a tubular nozzle body 2, in which a valve needle 3 is positioned. Valve needle 3 is in operative connection with a valve-closure member 4, which cooperates with a valve-seat surface 6 positioned on a valve-seat member 5, to form a sealing seat. In the exemplary embodiment, fuel injector 1 is an inwardly opening fuel injector 1, which has a plurality of spray-discharge orifices 7.

Nozzle body 2 is connected to an outer pole 9 of a magnetic coil 10. Magnetic coil 10 is wound on a coil brace 12, which rests against an inner pole 13 at magnetic coil 10. Magnetic coil 10 is energized via an electric line (not shown further) by an electric current, which may be supplied via an electrical plug contact 17. Plug contact 17 may be encased by a plastic coating (not shown further).

Via a flange 14 into which valve needle 3 is inserted and which is connected to valve needle 3 via a welding seam 15, valve needle 3 is in force-locked connection with an armature 20. Flange 14 may be designed in one piece with armature 20 or be welded or bonded thereto. Positioned in a recess 19 of armature 20 is a restoring spring 23 which, in the present design of fuel injector 1, is prestressed by a sleeve 24.

Fuel is supplied to fuel injector 1 via a central fuel supply 16. It is conveyed to the sealing seat via a bore 29 in armature 20, via valve needle 3 having a tubular design, and via flow-through orifices 8 in valve needle 3.

According to the present invention, fuel injector 1, at an inflow-side end face 11 of inner pole 13, is provided with an elastic membrane 18, which is joined to inner pole 13 by, for instance, a circumferential welding seam 21. At least one orifice 22 is formed in membrane 18. Membrane 18 is in operative connection with armature 20 via a plunger 25, which reaches through sleeve 24 and restoring spring 23. To protect plunger 25 from slipping at armature 20, plunger 25 is inserted into a blind-end bore 26 of armature 20. Plunger 25 may be connected to membrane 18, for instance, by a welding seam 27.

In the closed state of fuel injector 1, which is represented in FIG. 1, armature 20 is acted upon by restoring spring 23 in such a way that the at least one orifice 22 of membrane 18 is covered by inner pole 13, since membrane 18 rests flatly on the inflow-side end face 11 of inner pole 13, and plunger 25, which is in operative connection with armature 20, is in its rest position, so that membrane 18 is not deformed by plunger 25. Valve-closure member 4, formed at valve needle 3, is sealingly held at valve seat 6. A working gap 28 formed between end face 30 of armature 20 and inner pole 13 is open.

When magnetic coil 10 is energized by the electric line (not shown further) via plug contact 17, a magnetic field is built up which pulls armature 20 to inner pole 13, counter to the force of restoring spring 23, thereby closing working gap 28 between inflow-side end face 11 of armature 20 and inner pole 13. Due to the movement of armature 20, plunger 25, having been inserted into blind-end bore 26 of armature 20, is also moved in a lift direction, counter to the pressure of membrane 18, thereby giving membrane 18 a convex shape in the lift direction. The at least one orifice 22 is released by the membrane lifting off from the inflow-side end face 11 of inner pole 13. As a result, the fuel supplied via central fuel supply 16, is able to flow to the sealing seat through the at least one orifice 22, as well as bore 29 in armature 20, and the valve needle.

If the coil current is switched off, armature 20 falls away from inner pole 13 after sufficient decay of the magnetic field, due to the pressure of restoring spring 23, whereupon valve needle 3, which is in operative connection with flange 14 at armature 20, moves in a direction counter to the lift direction. As a result, valve 25 closure member 4 comes to rest on valve-seat surface 6, and fuel injector 1 is closed. Plunger 25 returns to its original position due to armature 20 falling away from inner pole 13, and due to the initial stress of membrane 18, which is joined to plunger 25 in a force-locking manner. The at least one orifice 22 is covered by inner pole 13 again.

Figure 2:
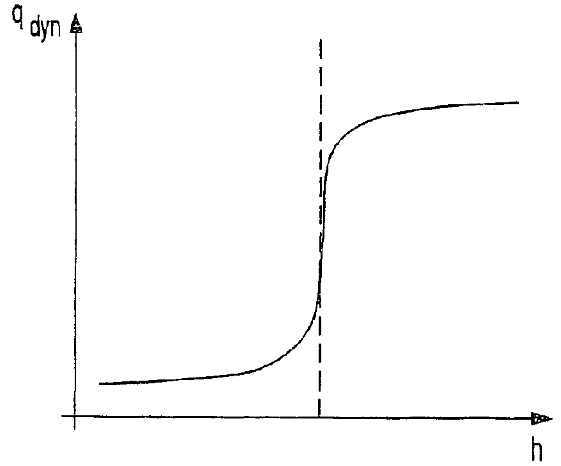
FIG. 2 shows a schematic representation of the dynamic flow rate $q_{dyn}$ as a function of the valve needle lift of the fuel injector according to the present invention, as represented in FIG. 1.

FIG. 2 shows a schematic representation of flow-rate quantity $q_{dyn}$ flowing through fuel injector 1, as a function of lift h of valve needle 3 of fuel injector 1.

By the afore-described configuration of the at least one orifice 22 in membrane 18, a characteristic curve, which represents the dynamic flow rate $q_{dyn}$ of fuel through the fuel injector as a function of a lift h of valve needle 3, may be adjusted or modeled. By an appropriate lift adjustment of valve needle 3, the fuel quantity required within the framework of the flow-rate precision to be obtained, will flow through fuel injector 1.

As a result of inner pole 13 covering the at least one orifice 22, no fuel is able to flow to the sealing seat at the beginning of the opening process. Only upon release of the at least one orifice 22, by membrane 18 being lifted up by plunger 25 when armature 20 is attracted, will the dynamic flow rate $q_{dyn}$ rise rapidly, and in an approximately step-like manner, to a saturation value, as shown in FIG. 2.

The described measures are able to improve the dynamics of fuel injector 1 and lower the production cost, since the construction of a free path of the armature is omitted and the minimal fuel quantity flowing through fuel injector 1 is minimized.

The at least one orifice 22 in membrane 18 is dimensioned such that it does not act as a throttle, but allows an unthrottled fuel flow through fuel injector 1 once it is released.

The present invention is not limited to the exemplary embodiments shown and is also applicable, for instance, to fuel injectors 1 for mixture-compressing, self-ignitable internal combustion engines.

What is claimed is:

1. A fuel injector comprising:

a valve needle;

an armature which, together with the valve needle, forms an axially movable valve part;

a restoring spring acting upon the armature;

a magnetic coil cooperating with the armature;

a valve-seat member;

a valve-closure member situated at the valve needle, the valve closure member forming a sealing seat with the valve-seat member;

an inner pole and an outer pole which form a magnetic circuit with the magnetic coil, the inner pole having an inflow-side end face; and a membrane situated at the inflow-side end face of the inner pole, including at least one orifice which is covered in a closed state of the fuel injector.

2. The fuel injector according to claim 1, further comprising a plunger, and wherein the membrane, via the plunger, is in operative connection with the armature.

3. The fuel injector according to claim 2, wherein the plunger is protected in a blind-end bore of the armature.

4. The fuel injector according to claim 2, wherein the plunger is connected to the membrane by force-locking.

5. The fuel injector according to claim 4, wherein the membrane is connected to the plunger via a welding seam.

6. The fuel injector according to claim 2, further comprising a sleeve, and wherein the plunger reaches through the restoring spring and the sleeve prestressing the restoring spring.

7. The fuel injector according to claim 6, wherein the restoring spring applies an initial stress to the armature.

8. The fuel injector according to claim 1, wherein the membrane is joined to the inflow-side end face of the inner pole by a circumferential welding seam.

9. The fuel injector according to claim 2, wherein, in an open state of the fuel injector, the at least one orifice of the membrane is released by elastic deformation of the membrane by the plunger.

* * * * *

UNITED STATES PATENT AND TRADEMARK OFFICE

CERTIFICATE OF CORRECTION

PATENT NO. : 6,899,293 B2 
DATED : May 31, 2005
INVENTOR(S) : Günter Dantes et al.

It is certified that error appears in the above-identified patent and that said Letters Patent is hereby corrected as shown below:

Title page,
Item [57], ABSTRACT,
Line 9, change "in the dosed state" to -- in the closed state --.

Signed and Sealed this

Thirteenth Day of September, 2005

JON W. DUDAS
*Director of the United States Patent and Trademark Office*